US010356820B1

(12) United States Patent
Kim et al.

(10) Patent No.: US 10,356,820 B1
(45) Date of Patent: Jul. 16, 2019

(54) APPARATUS AND METHOD FOR ACQUISITION OF FAST MULTI-CHANNEL DATA BASED ON LORAWAN

(71) Applicant: Pusan National University Industry-University Cooperation Foundation, Busan (KR)

(72) Inventors: Jongdeok Kim, Busan (KR); Jaeho Shin, Busan (KR); Donghyun Kim, Busan (KR); Junhwan Huh, Busan (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 0 days.

(21) Appl. No.: 16/208,833

(22) Filed: Dec. 4, 2018

(30) Foreign Application Priority Data

Dec. 27, 2017 (KR) .................. 10-2017-0180673

(51) Int. Cl.
| | |
|---|---|
| H04W 74/08 | (2009.01) |
| H04W 72/04 | (2009.01) |
| H04W 28/08 | (2009.01) |
| H04W 56/00 | (2009.01) |
| H04W 4/80 | (2018.01) |

(52) U.S. Cl.
CPC ......... H04W 74/0825 (2013.01); H04W 4/80 (2018.02); H04W 28/08 (2013.01);
(Continued)

(58) Field of Classification Search
CPC ......... H04W 74/0825; H04W 72/0446; H04W 72/0453; H04W 28/08; H04W 56/001;
(Continued)

(56) References Cited

U.S. PATENT DOCUMENTS

| | | | | |
|---|---|---|---|---|
| 2002/0176358 A1* | 11/2002 | Assa | .................. | H04L 47/2425 370/229 |
| 2009/0080380 A1* | 3/2009 | Chun | .................. | H04W 28/06 370/329 |

(Continued)

FOREIGN PATENT DOCUMENTS

| | | |
|---|---|---|
| KR | 10-2012-0127725 A | 11/2012 |
| KR | 10-2017-0042947 A | 4/2017 |
| KR | 10-1742997 B1 | 6/2017 |

OTHER PUBLICATIONS

Korean Notice of Allowance for related KR Application No. 10-2017-0180673 dated Mar. 2, 2018 from Korean Patent Office.

*Primary Examiner* — Robert J Lopata
(74) *Attorney, Agent, or Firm* — Paratus Law Group, PLLC

(57) ABSTRACT

An apparatus for acquisition of fast multi-channel data based on a long range wide area network (LoRaWAN) includes: a contention period data processor configured to insert a flag indicating the apparatus itself into an initial contention resolution queue (CRQ), determine whether a flag is a flag of the apparatus, and transmit an access request sequence (ARS) during a contention period; a feedback period data processor configured to check whether information taken out from a data transmission queue (DTQ) is a flag of the apparats, check whether a contention of the apparatus is resolved, and check whether there is a slot for which contention is not resolved among other slots during a feedback period.

14 Claims, 7 Drawing Sheets

(52) U.S. Cl.
CPC ....... *H04W 56/001* (2013.01); *H04W 56/005* (2013.01); *H04W 72/0446* (2013.01); *H04W 72/0453* (2013.01)

(58) Field of Classification Search
CPC ..... H04W 56/005; H04W 4/80; H04W 76/00; H04W 72/12; H04W 72/04; H04B 7/2123; H04B 7/2121
USPC .......................................................... 370/329
See application file for complete search history.

(56) References Cited

U.S. PATENT DOCUMENTS

| | | | |
|---|---|---|---|
| 2010/0074204 A1* | 3/2010 | Meylan | H04L 1/1822 370/329 |
| 2010/0265896 A1* | 10/2010 | Park | H04W 72/0413 370/329 |
| 2011/0261763 A1* | 10/2011 | Chun | H04W 74/008 370/329 |
| 2014/0148197 A1* | 5/2014 | Shields | H04W 4/90 455/456.1 |
| 2014/0226621 A1* | 8/2014 | Choi | H04W 36/0061 370/331 |
| 2014/0229519 A1* | 8/2014 | Dietrich | H04L 67/10 709/201 |
| 2016/0135145 A1* | 5/2016 | Tirronen | H04W 72/042 370/336 |
| 2017/0223744 A1* | 8/2017 | Qian | H04W 74/0833 |
| 2018/0317263 A1* | 11/2018 | Ishii | H04W 74/0833 |
| 2018/0323856 A1* | 11/2018 | Xiong | H04B 7/0695 |

\* cited by examiner

FIG. 5A

- N: THE NUMBER OF TERMINALS, K: THE NUMBER OF CHANNELS
- W: THE NUMBER OF CONTENTION SLOTS, $T_\omega$: ARS TRANSMISSION TIME
- $T_f$, $T_{f\,JOINT}$ : FBP TRANSMISSION TIME
- $T_d$: DATA TRANSMISSION TIME
- $T_c$, $T_{c\,joint}$: CONTROL PERIOD TIME
  - $W \cdot T_\omega + T_f$
- $T_R$: TIME OF ONE ROUND
  - $T_c + T_d$
- $\Gamma$ : CONTROL LOAD RATIO
  - $\dfrac{Tc}{Tc + Td}$

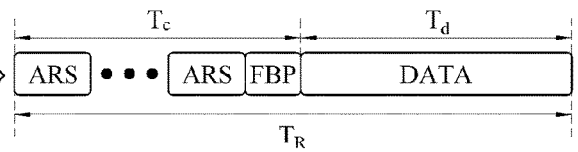

- $G_k$ ( $1 \leq k \leq k$ ) : THE NUMBER OF TERMINALS SELECTING CHANNEL K
  - $\sum_{k=1}^{K} G_k = N$
- Max(G), M: THE NUMBER OF ROUNDS REQUIRED FOR RESOLVING ALL CONTENTIONS ON CHANNEL THAT THE MOST TERMINALS ACCESS

FIG. 5B

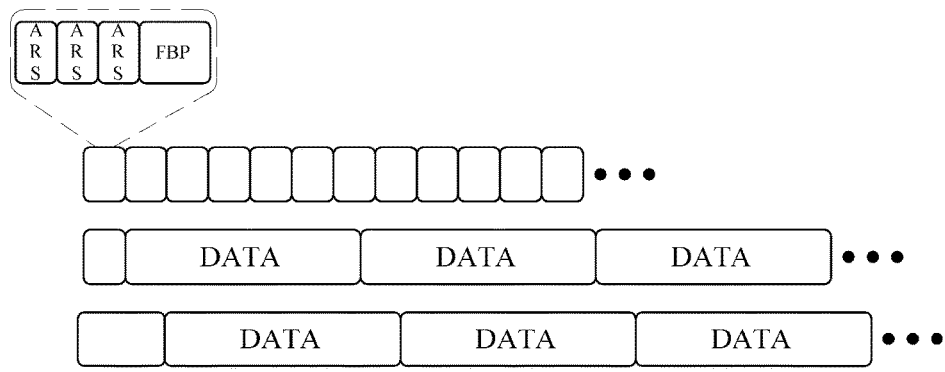

- Throughput $= \lim\limits_{N \to \infty} \dfrac{N \cdot T_d}{\left(T_{c_{joint}} + \left\lceil \dfrac{N}{K-1} \right\rceil \cdot T_d \right) \cdot K} \approx \dfrac{K-1}{K}$

APPARATUS AND METHOD FOR ACQUISITION OF FAST MULTI-CHANNEL DATA BASED ON LORAWAN

CROSS-REFERENCE TO RELATED APPLICATION

This application claims priority to and the benefit of Korean Patent Application No. 10-2017-0180673, filed on Dec. 27, 2017, the disclosure of which is incorporated herein by reference in its entirety.

BACKGROUND

The present invention relates to acquisition of fast multi-channel data, and more specifically, to an apparatus and method for acquisition of fast multi-channel data based on a long range wide area network (LoRaWAN), which increase data acquisition efficiency in a fast multi-channel environment, using a contention resolution queue (CRQ) and a data transmission queue (DTQ).

As the Internet of Things (IoT) service has become popular with the development of the Internet, a low power wide area (LPWA) communication that supports low-power consumption design, low-cost terminal supply, low construction cost, stable coverage, implementation of accessing a large number of terminals, and the like has been essentially required.

Among the currently available services, a long range wide area network (LoRaWAN) provided by the LoRa Alliance sets up a novel low-power Internet communication network and provides services.

Since a bandwidth of 1 GHz or less is utilized, it is easy to provide services in an environment in which many obstacles exist, and a coverage is relatively wide, so that the communication network construction cost can be reduced and the stable coverage can be secured.

The development of LoRaWAN technology is being pursed worldwide by mobile communication operators and major hardware and software companies.

In data transmission based on such a LoRaWAN, resource waste due to concentrated channel traffic occurs, thereby lowering data acquisition efficiency in a fast multi-channel environment.

Therefore, there is a need for developing a new technology that improves resource usage efficiency through control of all data channels.

PRIOR ARTS

Patent Documents

Korean Patent Publication No. 10-1742997
Korean Laid-open Patent Publication No. 10-2017-0042947
Korean Laid-open Patent Publication No. 10-2012-0127725

SUMMARY

The present invention aims to solve the above-described problems of a fast multi-channel data acquisition technology and provide an apparatus and method for acquisition for fast multi-channel data based on a long range wide area network (LoRaWAN), which increase data acquisition efficiency in a fast multi-channel data environment, using a contention resolution queue (CRQ) and a data transmission queue (DTQ).

The present invention aims to provide an apparatus and method for acquisition of fast multi-channel data based on a LoRaWAN, which allow efficient use of resources in a fast multi-channel environment, using a CRQ which determines whether to transmit an access request sequence (ARS) at a current round and a DTQ which determines whether to transmit data at a current round.

The present invention aims to provide an apparatus and method for acquisition of fast multi-channel data based on a LoRaWAN, which maximize the resource usage with distributed channel traffic by inserting a flag indicating an apparatus into an initial CRQ and selecting a contention slot and transmitting an ARS when information taken out from the CRQ is a flag of the terminal during a contention period.

The present invention aims to provide an apparatus and method for acquisition of fast multi-channel data based on a LoRaWAN, which increase data acquisition efficiency in a fast multi-channel environment by receiving a contention result through an FBP, selecting a channel according to the contention result, and transmitting data in a feedback period.

The present invention is not limited hereto, and other objectives not described above will be more clearly understood from what has been set forth hereunder.

In one general aspect, there is provided an apparatus for acquisition of fast multi-channel data based on a LoRaWAN, including: a contention period data processor configured to insert a flag indicating the apparatus itself into an initial CRQ, determine whether a flag is a flag of the apparatus, and transmit an ARS during a contention period; a feedback period data processor configured to check whether information taken out from a DTQ is a flag of the apparats, check whether a contention of the apparatus is resolved, and check whether there is a slot for which contention is not resolved among other slots during a feedback period; and a data transmitter configured to insert the flag of the apparatus itself into the DTQ, take out one flag from the DTQ at each round, and transmit data when the flag is the flag of the apparatus during a data transmission period.

The contention period data processor may include a flag inserter configured to insert the flag indicating the apparatus itself into the initial CRQ, an ARS transmission determiner configured to determine whether to transmit the ARS by determining whether the information taken out from the CRQ is the flag of the apparatus itself, and an ARS transmitter configured to select a contention slot when the information taken out from the CRQ is the flag of the apparatus and transmit the ARS.

The feedback period data processor may include a feedback packet (FBP) receiver configured to receive an FBP, a flag checker configured to check whether the information taken out from the DTQ is the flag of the apparatus itself, a contention result checker configured to check whether a contention of the apparatus is resolved, and a slot contention result checker configured to check whether there is a slot for which contention is not resolved among other slots.

The ARS may be transmitted when the CRQ is empty and when content of a CRQ head allows transmission.

Channels may be divided into a control and data transmission channel consisting of a contention slot, a feedback slot, and a data slot and a data transmission channel consisting of only a data slot.

All terminals may contend on the same control and data transmission channel and a gateway is capable of simultaneously receiving physical channels specified in a LoRaWAN standard.

The gateway may sequentially allocate terminals with contention resolved to data channels to distribute a channel traffic load, transmit a synchronization packet (FBP) notifying time synchronization of terminals and the number of contention slots, transmit information on whether a collision between ARSs transmitted for contention occurs to the terminals, and transmit information (FBP) on the data transmission channel and a transmission time to the terminal with contention resolved.

In another general aspect, there is provided a method for acquisition of fast multi-channel data based on a LoRaWAN, including: inserting a flag of a terminal into an initial CRQ during a terminal process; selecting a contention slot and transmitting an ARS when information taken out from the CRQ is a flag of the terminal; after receiving a contention result through a FBP, inserting the flag of the terminal into a CRQ when information taken out from the CRQ is the flag of the terminal; updating a data transmission channel and a DTQ and inserting the flag of the terminal into the DTQ when a contention of the process is resolved; and checking whether information taken out from the flag of the terminal and transmitting data through a corresponding channel when the information is the flag of the terminal.

The selecting of the contention slot may include staying in standby mode for a contention period when the information is not the flag of the terminal, and selecting the contention slot and transmitting the ARS when the information is the flag of the terminal.

The inserting of the flag of the terminal into the CRQ may include determining whether there is a slot for which contention is not resolved among other slots when the received contention result is not a contention result of the process, and increasing a size of the CRQ when there is a slot for which contention is not resolved among other slots.

The inserting of the flag of the terminal into the CRQ may include checking whether a contention of the process is resolved when the received contention result is a contention result of the process, determining whether there is a slot for which contention is not resolved among other slots when the contention of the process is not resolved, and increasing a size of the CRQ when there is a slot for which contention is not resolved among other slots.

The transmitting of the ARS may be performed when the CRQ is empty and when content of a CRQ head allows transmission.

Channels may be divided into a control and data transmission channel consisting of a contention slot, a feedback slot, and a data slot and a data transmission channel consisting of only a data slot.

While the process in the terminal is in progress, a gateway may sequentially allocate terminals with contention resolved to data channels to distribute a channel traffic load and the gateway may perform operations of transmitting a synchronization packet (FBP) notifying time synchronization of terminals and the number of contention slots, transmitting information on whether a collision between ARSs transmitted for contention occurs to the terminals, and transmitting information (FBP) on the data transmission channel and a transmission time to the terminal with contention resolved.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIGS. 5A and 5B are configuration diagrams for describing symbol definition and performance analysis by acquisition of fast multi-channel data based on a LoRaWAN according to the present invention.

DETAILED DESCRIPTION

Hereinafter, exemplary embodiments of an apparatus and method for acquisition of fast multi-channel data based on a long range wide area network (LoRaWAN) will be described in detail.

Features and advantages of the apparatus and method for acquisition of fast multi-channel data based on a LoRaWAN will be apparent from detailed descriptions of each embodiment below.

FIGS. 3A to 3D are configuration diagrams for describing a distributed queue (DQ) structure and a DQ protocol, and FIGS. 4A to 4D are configuration diagrams for describing acquisition of channel traffic and fast multi-channel data of a multi-channel-based LoRaWAN. The apparatus and method for acquisition of fast multi-channel data based on a LoRaWAN according to the present invention enable the efficient use of resources in a fast multi-channel environment by using a contention resolution queue (CRQ) which determines whether to transmit an access request sequence (ARS) at a current round and a data transmission queue (DTQ) which determines whether to transmit data at a current round.

To this end, the present invention may be configured to insert a flag indicating an apparatus into an initial flag and, when information taken out from a CRQ is the flag of the terminal, select a contention slot and transmit an ARS during a contention period.

The present invention may be configured to receive a contention result through a feedback packet (FBP), select a channel according to the contention result, and transmit data during a feedback period.

In the following description, a "contention period" is a period in which a terminal randomly selects a contention slot, a "feedback period" is a period in which a contention result is notified, and a "data period" is a period in which data transmission is possible without collision.

The process of acquisition of fast multi-channel data based on a LoRaWAN will be described below.

Figure 3A:
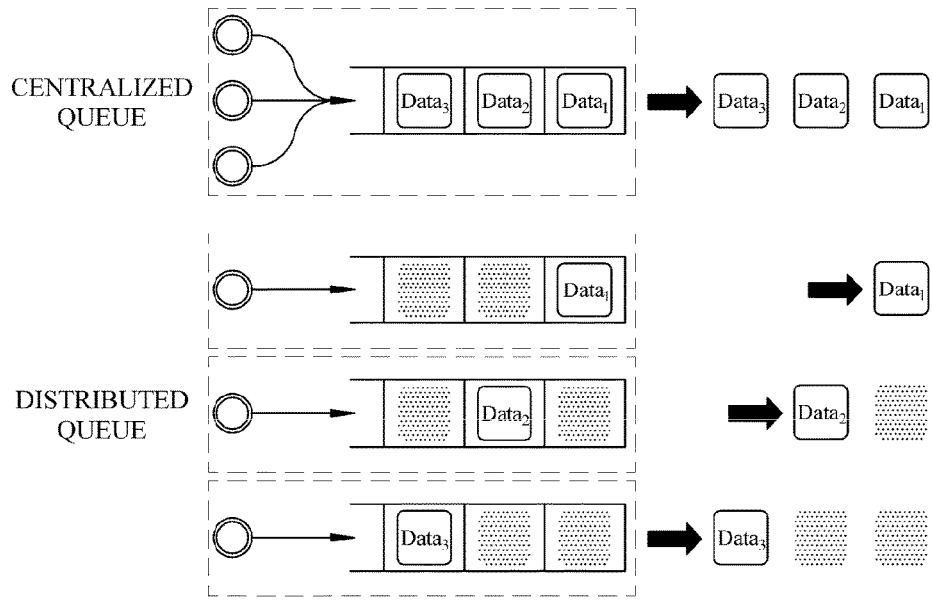
FIGS. 3A to 3D are configuration diagrams for describing a distributed queue (DQ) structure and a DQ protocol.

FIG. 3A is a diagram illustrating a DQ structure which shows configurations of a centralized queue and a distributed queue.

Figure 3B:
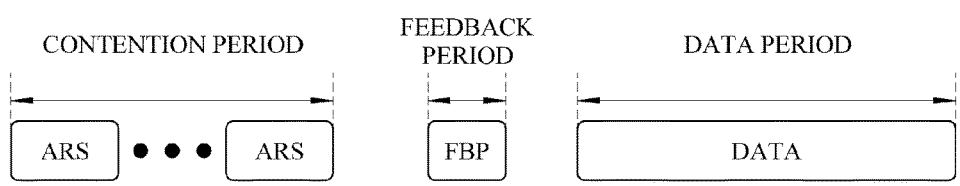

FIG. 3B is a diagram illustrating a DQ structure, in which the DQ has a contention period, a feedback period, and a data period, wherein a terminal randomly selects a contention slot and contends during the contention period, a contention result is informed during the feedback period, and data transmission without collision is possible during the data period.

Figure 3C:
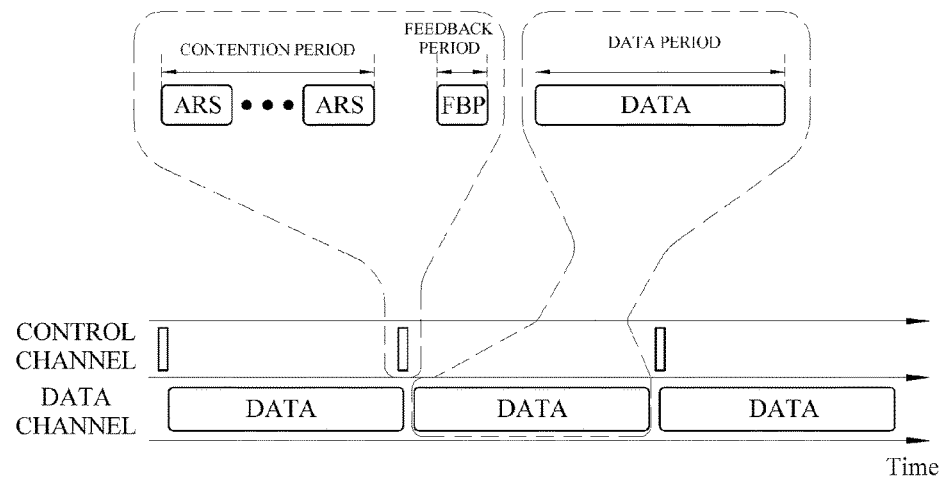

FIG. 3C is a diagram illustrating a DQ structure in which a control channel and a data channel are separate from each other.

Figure 3D:
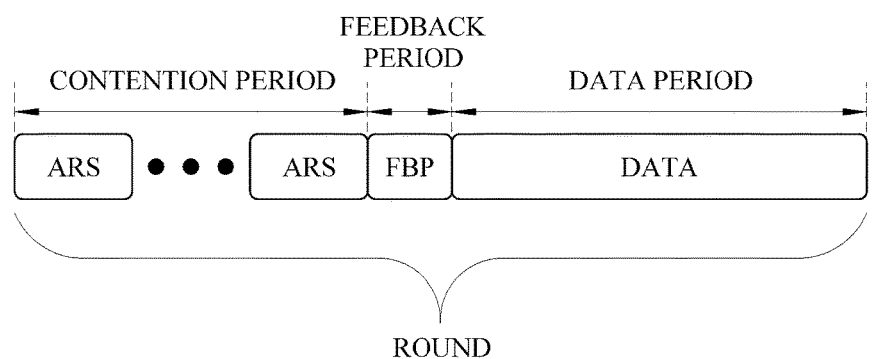

FIG. 3D is a diagram illustrating a DQ frame structure, in which the contention period, the feedback period, and the data period are defined as a round.

The contention period is a period for contention for acquiring a data slot and in this period, an ARS, which serves as a contention preamble of a terminal, is transmitted.

The feedback period is a period for transmitting a feedback packet (FBP) containing the contention result to notify a result of a contention among terminals.

In addition, as for roles of queues in the terminal, a CRQ is used to determine whether to transmit an ARS at a current round and a DTQ is used to determine whether to transmit data at a current round.

The ARS is transmitted when a CRQ is empty and when the content of a CQR head allows transmission.

In addition, FIGS. 4A to 4D are diagrams for describing acquisition of channel traffic and fast multi-channel data of a multi-channel-based LoRaWAN.

Figure 4A:
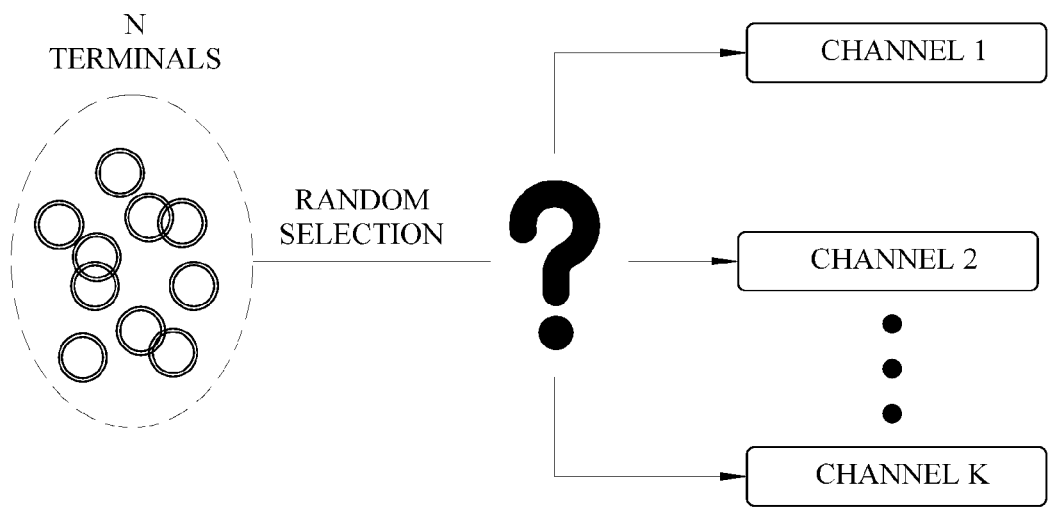
FIGS. 4A to 4D are configuration diagrams for describing a channel traffic and fast multi-channel data acquisition in a multi-channel based LoRaWAN.

As shown in FIG. 4A, in the multi-channel-based LoRaWAN, N terminals randomly select K channels to transmit data and generally the number N of terminals is greater than the number K of channels.

Figure 4B:
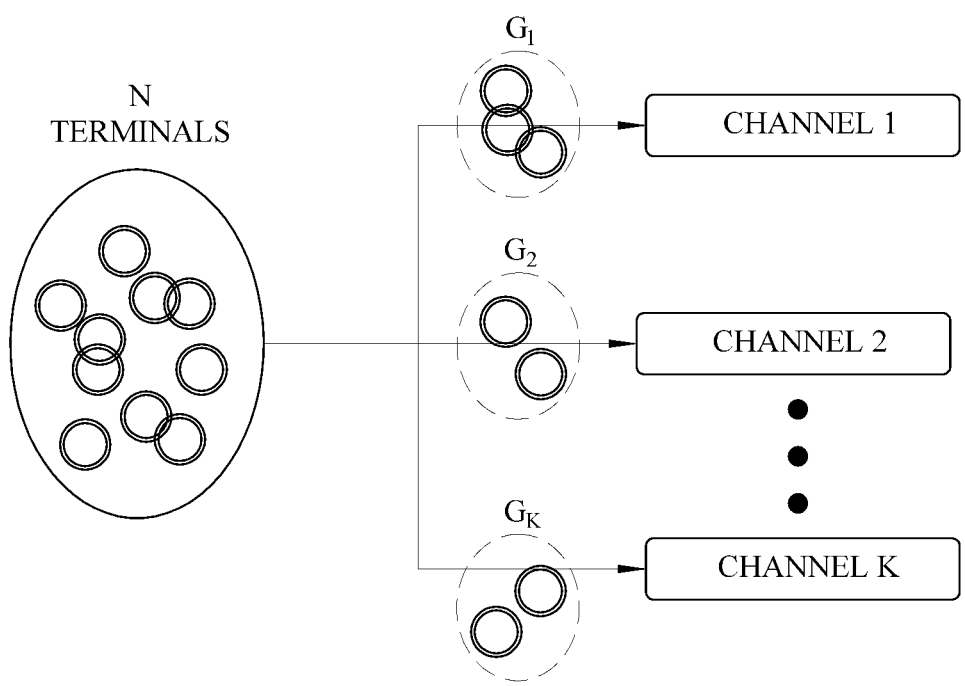

FIG. 4B is a diagram illustrating an ideal form in which the resource usage is maximized by distributed channel traffic.

Figure 4C:
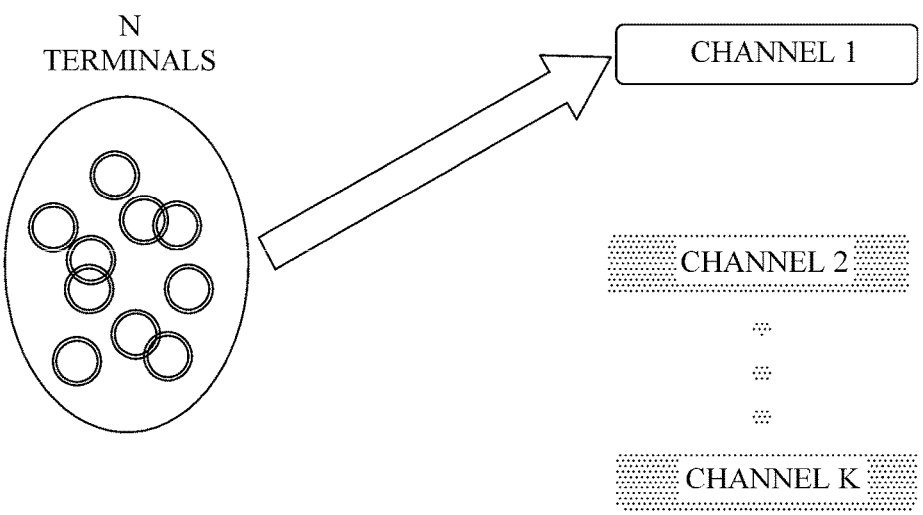

FIG. 4C is a diagram illustrating a case in which N terminals concentrate on one channel, showing a waste of resource due to concentrated channel traffic.

Figure 4D:
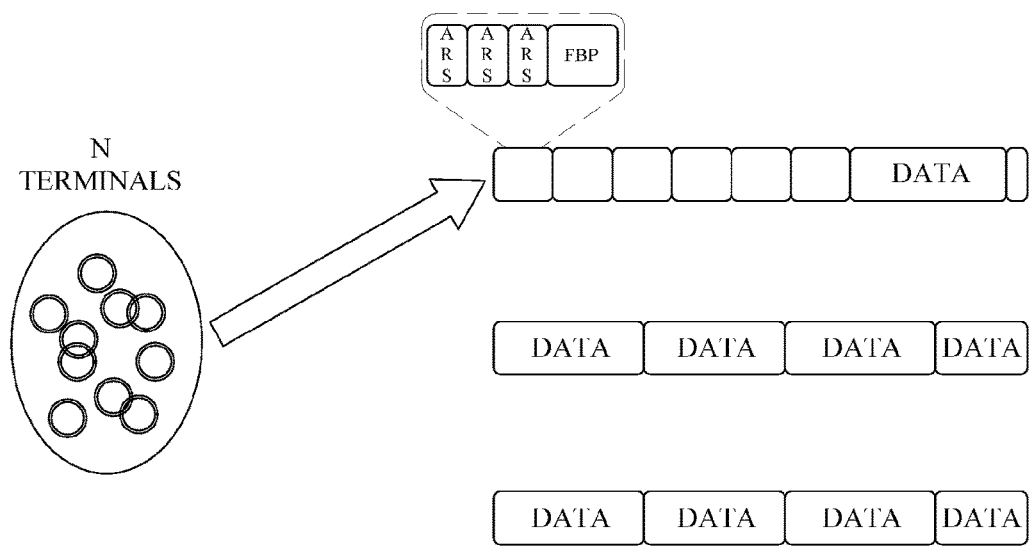

FIG. 4D is a diagram illustrating acquisition of fast multi-channel data based on a LoRaWAN according to the present invention, for which a control channel and a data channel are separate from each other, an ARS serving as a contention preamble of a terminal is transmitted during a contention period and an FBP containing a contention result is transmitted in a feedback period so that all data channels can be controlled.

In the apparatus and method for acquisition of fast multi-channel data based on a LoRAWAN according to the present invention, channels are divided into a control and data transmission channel and a data transmission channel, and terminals contend only on the control and data transmission channel.

The control and data transmission channel consists of a contention slot, a feedback slot, and a data slot, and the data transmission channel consists of only data slots.

In addition, a gateway must be able to simultaneously receive physical channels specified in the LoRaWAN standard, and all terminals contend on the same channel.

The gateway sequentially allocates terminals with contention resolved to data channels to distribute a channel traffic load.

The gateway process proceeds as follows.

First, the gateway transmits a synchronization packet (FBP) notifying time synchronization of terminals and the number of contention slots.

Then, information on whether a collision between ARSs transmitted for contention occurs is transmitted to the terminals.

Information (FBP) on the data transmission channel and a transmission time is transmitted to the terminal with contention resolved.

Figure 1:
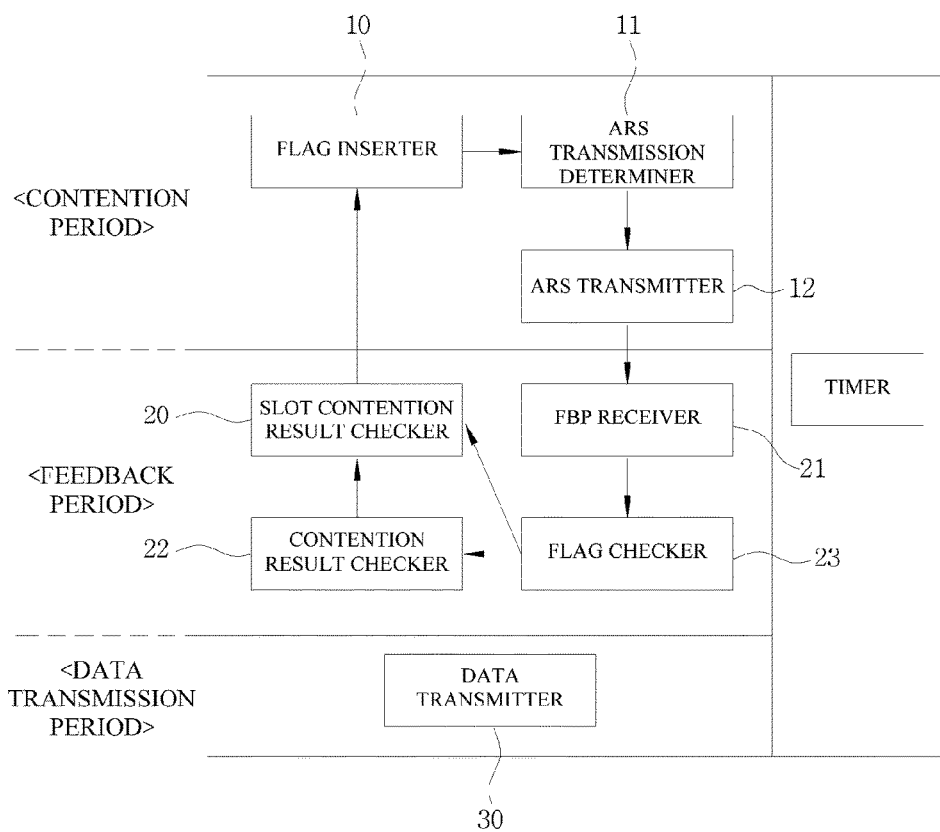
FIG. 1 is a configuration diagram illustrating an apparatus for acquisition of fast multi-channel data based on a long range wide area network (LoRaWAN) according to the present invention.

FIG. 1 is a configuration diagram illustrating an apparatus for acquisition of fast multi-channel data based on a LoRaWAN according to the present invention.

As shown in FIG. 1, the apparatus for acquisition of fast multi-channel data based on a LoRaWAN according to the present invention includes a contention period data processor configured to perform a data acquisition process in a contention period, wherein the contention period data processor includes a flag inserter 10 configured to insert a flag indicating the apparatus itself into an initial CRQ, an ARS transmission determiner 11 configured to determine whether to transmit an ARS by determining whether information taken out from the CRQ is a flag of the apparatus itself, and an ARS transmitter 12 configured to select a contention slot and transmit an ARS when the information taken out from the CRQ is the flag of the apparatus.

In addition, a feedback period data processor configured to perform a data acquisition process in a feedback period includes an FBP receiver 21 configured to receive an FBP, a flag checker 23 configured to check whether information taken out from a DTQ is the flag of the apparatus, a contention result checker 22 configured to check whether contention of the apparatus is resolved, and a slot-contention result checker 20 configured to check whether there is a slot for which contention is not resolved among other slots.

Further, a data transmitter 30 is configured to insert the flag of the apparatus into the DTQ, take out one flag from the DTQ at each round, and transmit data when the flag is the flag of the apparatus.

A method of acquisition of fast multi-channel data based on a LoRaWAN according to the present invention will be described below.

Figure 2:
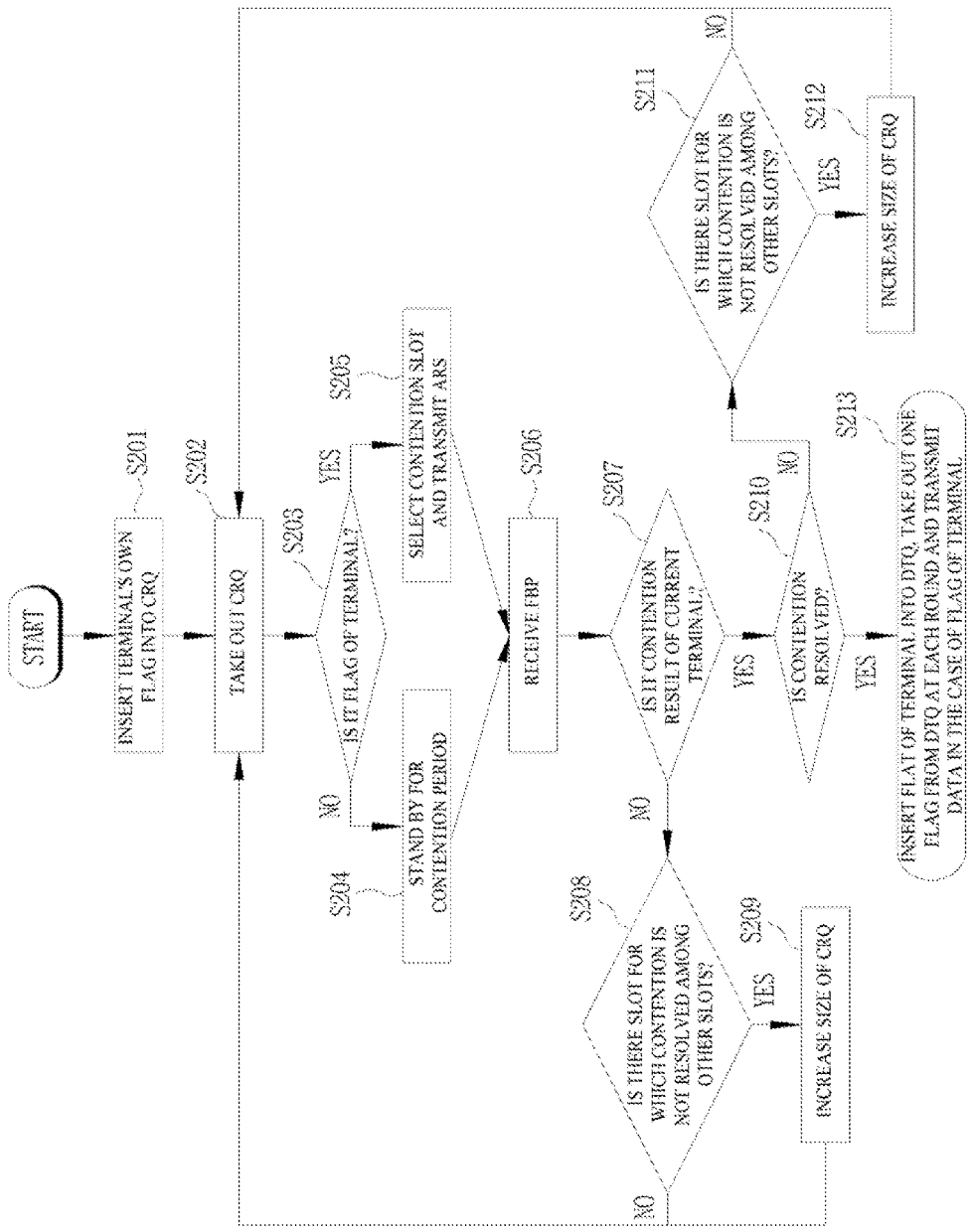
FIG. 2 is a flowchart illustrating a method of acquisition of fast multi-channel data based on a LoRaWAN according to the present invention.

FIG. 2 is a flowchart illustrating a method of acquisition of fast multi-channel data based on a LoRaWAN according to the present invention.

The method of acquisition of fast multi-channel data based on a LoRaWAN according to the present invention includes: inserting a flag of a terminal into an initial CRQ during a terminal process; selecting a contention slot and transmitting an ARS when information taken out from the CRQ is the flag of the terminal; after receiving a contention result through an FBP, inserting the flag of the terminal into the CRQ when a contention of the terminal is not resolved; updating a data transmission channel and a DTQ and inserting the flag of the terminal into the DTQ when a contention of the terminal is resolved; and checking whether information taken out from the DTQ is the flag of the terminal for a round and transmitting data through a corresponding channel when the information is the flag of the terminal.

Specifically, as shown in FIG. 2, a flag indicating the terminal itself is inserted into an initial CRQ (S201).

Information is taken out from the CRQ (S202) and whether the information taken out from the CRQ is the flag of the terminal is determined (S203).

When the information is not its own flag, the terminal stays in standby mode for a contention period (S204), and when the information is its own flag, a contention slot is selected and an ARS is transmitted (S205).

In addition, a contention result is received through an FBP in a feedback period (S206), whether the received contention result is a contention result of the terminal is checked (S207), and when the contention result is not a contention result of the terminal, whether there is a slot for which contention is not resolved among other slots is determined (S208).

When there is a slot for which contention is not resolved among other slots, a size of the CRQ is increased (S209).

In addition, when the received contention result is the contention result of the terminal, it is checked whether contention of the terminal is resolved (S210), and when the contention of the terminal is not resolved, whether there is a slot for which contention is not resolved among other slots is checked (S211).

When there is a slot for which contention is not resolved among other slots, a size of the CRQ is increased (S212).

When the contention of the terminal is resolved, a flag of the terminal is inserted into a DTQ in a data transmission period, one DTQ is taken out at each round, and data is transmitted when the taken DTQ is the flag of the terminal (S213).

FIGS. 5A and 5B are configuration diagrams for describing symbol definition and performance analysis by acquisition of fast multi-channel data based on a LoRaWAN according to the present invention.

In the present invention, the number of contention slots (W) may be set by Equation 1 below.

$$R_N = \frac{1 + \frac{\sum_{K=2}^{N-1} \binom{N}{K}(W-1)^{N-K} R_k}{W^{N-1}}}{1 - \frac{1}{W^N - 1}} \quad \text{[Equation 1]}$$

Here, $R_N$ denotes the average number of rounds necessary for resolving N contentions.

The performance of fast multi-channel data acquisition in accordance with the present invention may be defined as Equation 2.

$$\text{Throughput} = \lim_{N \to \infty} \frac{N \cdot T_d}{\left(T_{c_{joint}} + \left\lceil \frac{N}{K-1} \right\rceil \cdot T_d\right) \cdot K} \approx \frac{K-1}{K} \quad \text{[Equation 2]}$$

In FIG. 5A, N denotes the number of terminals, K denotes the number of channels, W denotes the number of contention slots, $T\omega$ denotes ARS transmission time, Tf and $Tf_{joint}$ denote FBP transmission times, Td denotes data transmission time, Tc and $Tc_{joint}$ denote control period times, and $T_R$ denotes time of one round.

The apparatus and method for acquisition of fast multi-channel data based on a LoRaWAN according to the present invention allow the efficient use of resources in a fast multi-channel environment by using a CRQ which determines whether to transmit an ARS and a DTQ which determines whether to transmit data at a current round.

As set forth above, according to exemplary embodiments of the invention, the apparatus and method for acquisition of fast multi-channel data based on a LoRaWAN according to the present invention has the following effects.

First, it is possible to improve data acquisition efficiency in a fast multi-channel environment, using a CRQ and a DTQ.

Second, it is possible to efficiently use resources in a fast multi-channel environment, using a CRQ which determines whether to transmit an ARS at a current round and a DTQ which determines whether to transmit data at a current round.

Third, it is possible to maximize the resource usage with distributed channel traffic by inserting a flag indicating a terminal itself into an initial CRQ and selecting a contention slot and transmitting an ARS when information taken out from the CRQ is a flag of the terminal itself during a contention period.

Fourth, it is possible to increase data acquisition efficiency in a fast multi-channel environment by receiving a contention result through an FBP, selecting a channel according to the contention result, and transmitting data in a feedback period.

As described above, it should be understood by those skilled in the art that various modifications and changes can be made without departing from substantial features of the invention.

Therefore, the disclosed embodiments should be considered in the aspect of illustration rather than restriction. It should be understood that the scope of the invention appears in claims rather than in the foregoing specification, and equivalents of the claims are included in the invention.

What is claimed is:

1. An apparatus for acquisition of fast multi-channel data based on a long range wide area network (LoRaWAN), the apparatus comprising:
   a contention period data processor configured to insert a flag indicating the apparatus itself into an initial contention resolution queue (CRQ), determine whether a flag is a flag of the apparatus, and transmit an access request sequence (ARS) during a contention period;
   a feedback period data processor configured to check whether information taken out from a data transmission queue (DTQ) is a flag of the apparats, check whether a contention of the apparatus is resolved, and check whether there is a slot for which contention is not resolved among other slots during a feedback period; and
   a data transmitter configured to insert the flag of the apparatus itself into the DTQ, take out one flag from the DTQ at each round, and transmit data when the flag is the flag of the apparatus during a data transmission period.

2. The apparatus of claim 1, wherein the contention period data processor comprises:
   a flag inserter configured to insert the flag indicating the apparatus itself into the initial CRQ;
   an ARS transmission determiner configured to determine whether to transmit the ARS by determining whether the information taken out from the CRQ is the flag of the apparatus itself; and
   an ARS transmitter configured to select a contention slot when the information taken out from the CRQ is the flag of the apparatus and transmit the ARS.

3. The apparatus of claim 1, wherein the feedback period data processor comprises:
   a feedback packet (FBP) receiver configured to receive an FBP;
   a flag checker configured to check whether the information taken out from the DTQ is the flag of the apparatus itself;
   a contention result checker configured to check whether a contention of the apparatus is resolved; and
   a slot contention result checker configured to check whether there is a slot for which contention is not resolved among other slots.

4. The apparatus of claim 1, wherein the ARS is transmitted when the CRQ is empty and when content of a CRQ head allows transmission.

5. The apparatus of claim 1, wherein channels are divided into a control and data transmission channel consisting of a contention slot, a feedback slot, and a data slot and a data transmission channel consisting of only a data slot.

6. The apparatus of claim 5, wherein all terminals contend on the same control and data transmission channel, and physical channels specified in a LoRaWAN standard are simultaneously receivable by a gateway.

7. The apparatus of claim 6, wherein the gateway is configured to:
- sequentially allocate terminals with contention resolved to data channels to distribute a channel traffic load;
- transmit a synchronization packet (FBP) notifying time synchronization of terminals and the number of contention slots;
- transmit information on whether a collision between ARSs transmitted for contention occurs to the terminals; and
- transmit information (FBP) on the data transmission channel and a transmission time to the terminal with contention resolved.

8. A method of acquisition of fast multi-channel data based on a long range wide area network (LoRaWAN), the method comprising:
- Inserting a flag of a terminal into an initial contention resolution request (CRQ) during a terminal process;
- selecting a contention slot and transmitting an access request sequence (ARS) when information taken out from the CRQ is a flag of the terminal;
- after receiving a contention result through a feedback packet (FBP), inserting the flag of the terminal into a CRQ when information taken out from the CRQ is the flag of the terminal itself;
- updating a data transmission channel and a data transmission queue (DTQ) and inserting the flag of the terminal into the DTQ when a contention of the process is resolved; and
- checking whether information taken out from the flag of the terminal and transmitting data through a corresponding channel when the information is the flag of the terminal.

9. The method of claim 8, wherein the selecting of the contention slot comprises staying in standby mode for a contention period when the information is not the flag of the terminal, and selecting the contention slot and transmitting the ARS when the information is the flag of the terminal.

10. The method of claim 8, wherein the inserting of the flag of the terminal into the CRQ comprises determining whether there is a slot for which contention is not resolved among other slots when the received contention result is not a contention result of the process, and increasing a size of the CRQ when there is a slot for which contention is not resolved among other slots.

11. The method of claim 8, wherein the inserting of the flag of the terminal into the CRQ comprises checking whether a contention of the process is resolved when the received contention result is a contention result of the process, determining whether there is a slot for which contention is not resolved among other slots when the contention of the process is not resolved, and increasing a size of the CRQ when there is a slot for which contention is not resolved among other slots.

12. The method of claim 8, wherein the transmitting of the ARS is performed when the CRQ is empty and when content of a CRQ head allows transmission.

13. The method of claim 8, wherein channels are divided into a control and data transmission channel consisting of a contention slot, a feedback slot, and a data slot and a data transmission channel consisting of only a data slot.

14. The method of claim 8, wherein, while the process in the terminal is in progress, a gateway sequentially allocates terminals with contention resolved to data channels to distribute a channel traffic load, and the gateway performs operations of transmitting a synchronization packet (FBP) notifying time synchronization of terminals and the number of contention slots, transmitting information on whether a collision between ARSs transmitted for contention occurs to the terminals, and transmitting information (FBP) on the data transmission channel and a transmission time to the terminal with contention resolved.

* * * * *